United States Patent Office 3,497,491
Patented Feb. 24, 1970

3,497,491
1-DEAMINO-8-D-ARGININE VASOPRESSIN
Milan Zaoral, Ivan Vavra, Alena Machova, and Frantisek Sorm, Prague, Czechoslovakia, assignors to Ceskoslovenska Akademie Ved., Prague, Czechoslovakia
No Drawing. Filed Sept. 14, 1967, Ser. No. 667,679
Claims priority, application Czechoslovakia,
Sept. 15, 1966, 5,996/66
Int. Cl. C07c *103/52;* A61k *17/00;* C07d *93/36*
U.S. Cl. 260—112.5                                    1 Claim

ABSTRACT OF THE DISCLOSURE

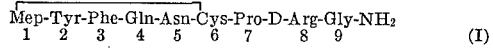

$$\text{Mep-Tyr-Phe-Gln-Asn-Cys-Pro-D-Arg-Gly-NH}_2 \quad (I)$$
$$\;1\quad\;2\quad\;3\quad\;4\quad\;5\quad\;6\quad\;7\quad\;\;8\quad\;\;9$$

wherein Mep is β-mercaptopropionic acid (Mep) at position 1 and D-arginine is at position 8.

The compound of the invention has a high and specific antidiuretic action.

BACKGROUND OF THE INVENTION

Compounds exhibiting a high and specific antidiuretic activity are important in the therapy of diabetes insipidus. Such compounds are well known and represent structural modifications of the vasopressin molecule. The most suitable properties have been observed in the case of 1-deamino-Phe²-Arg⁸-vasopressin (cf. the table below).

SUMMARY OF THE INVENTION

It is an object of the present invention to provide for an antidiuretic that has a higher degree of activity and is more specific in its action than the just named vasopressin compound.

This is accomplished by a polypeptide of the Formula I

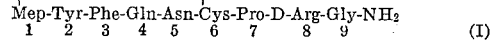

$$\text{Mep-Tyr-Phe-Gln-Asn-Cys-Pro-D-Arg-Gly-NH}_2 \quad (I)$$
$$\;1\quad\;2\quad\;3\quad\;4\quad\;5\quad\;6\quad\;7\quad\;\;8\quad\;\;9$$

wherein Mep is β-mercaptopropionic acid (Mep) at position 1 and D-arginine is at position 8.

The compound of the invention has a high and specific antidiuretic activity.

DESCRIPTION OF THE PREFERRED EMBODIMENTS

The compound of the invention is preferably formed by condensation of β-benzylmercaptopropionyl-L-tyrosyl-L-phenylalanyl - L - glutaminyl-L-asparaginyl-S-benzyl-L-cysteine azide with L-prolyl-N^G-tosyl - D - arginylglycinamide to give the protected octapeptide derivative of the following Formula II Mep(R¹)-Tyr-Phe-Gln-Asn-Cys(R¹)-Pro-D-
Arg(R²)-Gly-NH₂ (II)

wherein R¹ and R² are protective groups, e.g., R¹ may be benzyl and R² may be a p-toluenesulfonyl group. This step is followed by removal of the protective groups of Formula II by a reduction reaction, e.g., by the action of an alkali metal in liquid ammonia to give the reduced polypeptide of Formula III

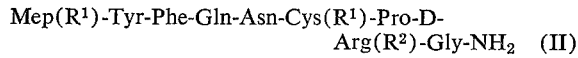

Mep(SH)-Tyr-Phe-Gln-Asn-Cys(SH)-Pro-D-
Arg-Gly-NH₂ (III)

which latter is then oxidized, preferably with potassium ferricyanide in an aqueous solution at pH 6.5–7 to give the polypeptide of Formula I.

The protected octapeptide derivative of Formula II can also be obtained by other procedures such as are conventional in the preparation of polypeptides. The compound II may be thus prepared by a stepwise synthesis starting with the amino terminal group as well as the carboxylic terminal group, or by coupling of polypeptides containing the partial amino acid sequences of the final polypeptide of Formula I. The temporary protection of the amino groups, mercapto (sulfhydryl) groups and of the guanidine group may be performed by means of substituents that are conventional in the synthetic chemistry of polypeptides. E.g., a t-butyloxycarbonyl, o-nitrophenylsulfenyl or trityl group can be used for blocking of the amino groups, a trityl, benzoyl, or benzylthiomethyl group for the protection of the sulfhydryl function, and a tosyl or benzyloxycarbonyl group for the protection of the guanidine group.

The protective groups are then removed in the usual manner in one stage or successively. Oxidation of the reduced form of the polypeptide of Formula III to the cyclic polypeptide of Formula I may be accomplished by methods known per se, for instance, in an aqueous solution or in a mixture of water and solvents miscible with water.

Preferably, the following method is used. Condensation of β-benzylmercaptopropionyl chloride with tyrosine methyl ester leads to the so far unreported β-benzylmercaptopropionyl-L-tyrosine methyl ester. By the action of hydrazine hydrate, the latter compound is converted to the so far likewise unreported hydrazide and is then coupled with L-phenylalanine methyl ester. The resulting dipeptide ester derivative is condensed, again in the form of the azide, with L-glutaminyl-L-asparaginyl-S-benzyl-L-cysteine methyl ester to give the hitherto likewise unreported β - benzylmercaptopropionyl-L-tyrosyl-L-phenylalanyl-L-glutaminyl-L-asparaginyl-S-benzyl-L-cysteine methyl ester which is coupled (by the azide synthesis) with L-prolyl-N^G-tosyl-D-arginylglycinamide under formation of a new compound, the protected octapeptide derivative of Formula II. The protective groups are removed by reduction with sodium in liquid ammonia and the resulting reduced product is converted by oxidation with potassium ferricyanide to a new cyclic biologically active disulfide of Formula I.

The cyclic disulfide of Formula I exhibits a higher and more specific antidiuretic activity (see the table below) than the naturally occurring arginine-vasopressin. The disulfide I differs from arginine-vasopressin by the presence of β-mercaptopropionic acid at position 1 instead of cysteine and by the occurrence of D-arginine at position 8 instead of L-arginine. The polypeptide of Formula I which may be designated "1-deamino-8-D-arginine-vasopressin" represents—due to its biological activity—a valuable drug for the regulation of polyuria and moderation of polydypsia in the therapy of diabetes insipidus.

The following table compares the compound of the invention with the arginine-vasopressin.

For the determination of the antidiuretic activity the method of Sawyer (Sawyer, W. H. Endocrinology 63, 694 (1958)) as modified by Pliska et al. (Pliska, V.; Rychlik, I., Acta Endocrinol, 54, 129 (1967)) was used: experimental animals: Wistar rat, female, weight 150–210 g. The pressor activity was determined by the Landgrebe method (Landgrebe, F. W.; Macaulay, M. H.; Waring, H., Proceedings of the Royal Soc. Edinburg B 62, 202 (1946); experimental animals: male Wistar rates, weight 182–250 g.

TABLE

| Compound | Activity [a] | | Specificity of the action [b] |
|---|---|---|---|
| | Antidiuretic, I.U./mg. | Pressor, I.U./mg. | |
| 1-Deamino-D-Arg[8]-vasopressin | 16,000±200 | 11 | 1,454 |
| 1-Deamino-Phe[2]-Arg[8]-vasopressin [c] | 800±170 | 29±7 | 27.5 |

[a] The activity is expressed in international units per milligram.
[b] Specificity of the action is expressed by the ratio of the antidiuretic activity to the pressor activity.
[c] Huguenin, R. L., Boissonnas, R. A.: Helv. Chim. Acta 49, 695 (1966)

The polypeptide I of the invention may be used as the free base or in the form of its salts with inorganic or organic acids, without or with additives such as stabilizers, preservatives, sweetening agents, aromatic compounds, flavoring agents or detergents to obtain the suitable form, as desired, for the parenteral, peroral, intranasal, subcutaneous, intramuscular, or intravenous application. Thus, e.g., hydrochloric acid, phosphoric acid, and boric acid can be used as inorganic acids, acetic acid, citric acid, and tartaric acid as organic acids, and, tannin as a material having an acidic function. Furthermore, starch, lactose, natural or hydrogenated oils, talc, and glycerol can be used as further additives.

The preferred way of administration is subcutaneous but the drug can also be used by intranasal application. The dose is about 5–10 ng./kg./day in the first case. The dose for intranasal administration is approximately 200 ng./kg./day.

The invention will be further illustrated by the following examples, although it is not limited thereto. All temperatures are in degrees centigrade.

EXAMPLES

β-Benzylmercaptopropionyl-L-tyrosine methyl ester

β-Benzylmercaptopropionic acid (9.2 g.) is converted by reaction with thionyl chloride to the corresponding chloride. The latter is dissolved in ethyl acetate (20 ml.), and the solution, under vigorous stirring and cooling (0° C.), is added to a mixture of L-tyrosine methyl ester hydrochloride (10.9 g.), water (50 ml.), and ethyl acetate (50 ml.); the pH value of the reaction mixture is kept in the mild alkaline region by additions of sodium bicarbonate. The ethyl acetate layer is separated, dried, evaporated under subatmospheric pressure and the residue is crystallized from ethyl acetate-petroleum ether. An additional batch of product is obtained by evaporation of the mother liquors and recrystallization of the residue. Over-all yield, 16.3 g. (93%) of β-benzylmercaptopropionyl-L-tyrosine methyl ester, M.P. 89–90° C.; optical rotation: $[\alpha]_D^{25} - 3.4 \pm 0.5°$ (c. 0.5, dimethylformamide). For $C_{20}H_{23}NO_4S$ (373.5) calculated: 64.31% C., 6.21% H, 3.75% N; found: 64.38% C, 6.25% H, 3.71% N.

β-Benzylmercaptopropionyl-L-tyrosyl-L-phenylalanine methyl ester

β - Benzylmercaptopropionyl - L - tyrosine methyl ester (15.3 g.) is dissolved in ethanol (60 ml.), the solution is treated with 80% hydrazine hydrate (6 ml.), and the product is refluxed for 2 hours. An excess of water is then added to the slurry, the product is isolated by applying suction, and then washed while on the filter with water, and recrystallized from aqueous ethanol. Yield, 11.95 g. (78%) of β-benzylmercaptopropionyl-L-tyrosine hydrazide, M.P. 193–194° C.; optical rotation:

$$[\alpha]_D^{25} - 6.0 \pm 0.5°$$

(c. 0.5, dimethylformamide). For $C_{19}H_{23}N_3O_3S$ (373.5) calculated: 61.10% C, 6.21% H, 11.25% N; found: 61.10% C, 6.11% H, 11.15% N.

β-Benzylmercaptopropionyl-L-tyrosyl-L-phenylalanine methyl ester

β-Benzylmercaptopropionyl-L-tyrosine hydrazide (5.6 g.) is dissolved in a mixture of dimethylformamide (50 ml.) and concentrated hydrochloric acid (4 ml.). The solution is treated, under stirring and cooling (at −10° C.), with sodium nitrite (1.03 g.) in water (2 ml.). The pH of the reaction mixture is then adjusted to a value of from 6 to 7 with N-ethylpiperidine, and a solution of L-phenylalanine methyl ester (2.7 g.) in dimethylformamide (3 ml.) is added. The reaction mixture is left standing for 12 hours at 0° C. and for 2 hours at room temperature, and is evaporated under subatmospheric pressure. The oily residue is triturated with water, the product isolated by applying suction, and recrystallized from aqueous ethanol. Yield, 7.6 g. (97%) of β-benzylmercaptopropionyl-L-tyrosyl-L-phenylalanine methyl ester, M.P. 151–152° C.; optical rotation:

$$[\alpha]_D^{25} - 17.5 \pm 0.5°$$

(c. 0.5, dimethylformamide). For a product obtained in a 68% yield by coupling β-benzylmercaptopropionyl acid trichlorophenyl ester with L-tyrosyl-L-phenylalanine methyl ester the following values were given in the literature: M.P. 147–148° C., $[\alpha]_D^{23} - 17.5 \pm 1°$ (c. 1.45, dimethylformamide), cf. Huguenin, R. L.; Boissonnas, R. A: Helv. Chim. Acta 49, 695 (1966).

β-Benzylmercaptopropionyl-L-tyrosyl-L-phenylalanine hydrazide

A mixture of β-benzylmercaptopropionyl-L-tyrosyl-L-phenylalanine methyl ester (14.0 g.), methanol (100 ml.), and 80% hydrazine hydrate (6 ml.) is refluxed for 2 hours. The product which separates out is isolated by applying suction, washed while on the filter with methanol and ether, and recrystallized from dimethylformamide-water. Yield, 10.1 g. (72%) of β-benzylmercaptopropionyl-L-tyrosine - L - phenylalanine hydrazide, M.P. 248–250° C.; optical rotation: $[\alpha]_D^{24} - 21.9 \pm 0.5°$ (c. 0.55, dimethylformamide). Recorded (see the preceding paragraph): M.P. 251–253° C.

β-Benzylmercaptopropionyl - L - tyrosyl-L-phenylalanyl-L-glutaminyl-L-asparaginyl-S-benzyl-L-cysteine methyl ester β - Benzylmercaptopropionyl-L-tyrosyl-L-phenylalanine hydrazide (8.0 g.) is condensed with L-glutaminyl-L-asparaginyl-S-benzyl-L-cysteine methyl ester (7.2 g.) according to the general procedure developed by Zaoral, M.: Collection Czechoslov. Chem. Communs. 30, 1853 (1965). Recrystallization of the crude reaction product from dimethylformamide-water yields 11.3 g. (76%) of β-benzylmercaptopropionyl-L-tyrosyl - L - phenylalanyl-L-glutaminyl-L-asparaginyl-S-benzyl-L-cysteine methyl ester, M.P. 253–255° C.; optical rotation: $[\alpha]_D^{25} - 29.6 \pm 0.5°$ (c. 0.5, dimethylformamide). For $C_{48}H_{57}N_7O_{10}S_2 \cdot \frac{1}{2}H_2O$ (965.1) calculated: 59.73% C, 6.20% H, 10.27% N; found: 59.61% C, 6.23% H, 10.23% N.

β-Benzylmercaptopropionyl - L - tyrosyl-L-phenylalanyl-L - glutaminyl - L - asparaginyl-S-benzyl-L-cysteine hydrazide A solution of β-benzylmercaptopropionyl-L-tyrosyl-L-phenyl - alanyl - L - glutaminyl-L-asparaginyl-S-benzyl-L-cysteine methyl ester (10.8 g.) in dimethylformamide (160 ml.) is treated with 80% hydrazine hydrate (12 ml.) and the reaction mixture is allowed to stand at room temperature for 12 hours. The product which separates out is isolated by applying suction, washed on the filter with methanol and ether, and dried. Yield, 6.7 g. (62%) of β - benzylmercaptopropionyl-L-tyrosyl-L-phenylalanyl-L-glutaminyl-L-asparaginyl-S-benzyl-L-cysteine hydrazide, M.P. 266–268°, unchanged on recrystallization from dimethylformamide-water; optical rotation: $[\alpha]_D^{25} - 33.4$ ±0.5° (c. 0.5, dimethylformamide). For $C_{47}H_{57}N_9O_9S_2$ (956.1) calculated: 59.04% C, 6.01% H, 13.19% N; found: 59.04% C, 6.16% H, 13.25% N.

β-Benzylmercaptopropionyl - L - tyrosyl-L-phenylalanyl-L - glutaminyl-L-asparaginyl - S - benzyl-L-cysteinyl-L-prolyl-$N^G$-tosyl-D-arginyl-glycinamide The compound stated in this heading is prepared from β-benzylmercaptopropionyl - L - tyrosyl-L-phenylalanyl-L-glutaminyl - L - asparaginyl-S-benzyl-L-cysteine hydrazide and L-prolyl-$N^G$-tosyl-D-arginyl-glycinamide in a 68% yield according to the general procedure (vide supra). M.P. 223–5° C. For $C_{67}H_{84}N_{14}O_{14}S_3$ (1405.65) calculated: 57.24% C, 6.02% H, 13.95% N; found: 57.33% C, 6.01% H, 13.99% N.

1-deamino-8-D-arginine-vasopressin

β-Benzylmercaptopropionyl - L - tyrosyl-L-phenylalanyl-L-glutaminyl - L - asparaginyl - S benzyl-L-cysteinyl-L-prolyl-$N^G$-tosyl-D-arginyl-glycinamide (0.5 g.) is reduced with sodium in liquid ammonia according to the general procedure (vide supra). The liquid ammonia is then evaporated and the residue dissolved in 5% aqueous acetic acid (800 ml.). The solution is filtered to remove the undissolved portion and the filtrate is adjusted to a pH of 6.5 to 7 by addition of aqueous sodium hydroxide and it is then oxidized by known procedure, cf. Kimbrough, R. D., Jr.; Cash, W. D.; Branda, L. A.; Chan, W. Y.; and Du Vigneaud, V.; J. Biol. Chem. 238, 1411 (1963). The reaction mixture is thereupon adjusted to a pH of 4 to 4.5 by addition of acetic acid. The peptide is applied to a column of a carboxylate ion exchange resin, is eluted with 50% aqueous acetic acid and isolated by lyophilization (freeze-drying). The crude product is purified by known procedure using a carrier-free high-voltage electrophoresis, cf. Zaoral, M.; Šorm, F.: Collection Czechoslov. Chem. Communs. 31, 310 (1966). Yield, 100–200 mg. of 1-deamino-8-D-arginine-vasopressin; optical rotation $[\alpha]_D^{25}$ —65±2° (c. 0.2, 1 M $CH_3COOH$). For $C_{46}H_{64}N_{14}O_{12}S_2 \cdot 2CH_3COOH$ (1189.3) calculated: 50.49% C, 6.10% H, 16.48% N; found: 50.39% C, 6.32% H, 16.45% N. Amino acid analysis: ½ Cys 0.40, Tyr 0.98, Phe 1.03, Glu 1.05, Asp 1.00, Pro 1.03, Arg 0.98, Gly 0.95.

What is claimed as new and desired to be protected by Letters Patent is set forth in the appended claim:

1. The polypeptide of the formula

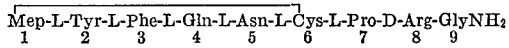

wherein Mep indicates β-mercaptopropionic acid.

References Cited

UNITED STATES PATENTS

| | | | |
|---|---|---|---|
| 3,418,307 | 12/1968 | Boissonnas et al. | 260—112.5 |
| 3,454,549 | 7/1969 | Boissonnas et al. | 260—112.5 |
| 3,371,080 | 2/1968 | Boissonnas et al. | 260—112.5 |

OTHER REFERENCES

Hope et al., J. Biol. Chem. 237, 1563–1566 (1962).
Huguenin et al., Experientia 21, 68–69 (1965).
Zaoral et al., Coll. Czech. Chem. Commun. 31, 382–383 (1966).

LEWIS GOTTS, Primary Examiner

M. KASSENOFF, Assistant Examiner

U.S. Cl. X.R.

260—470, 559; 424—177